United States Patent Office 3,515,630
Patented June 2, 1970

3,515,630
RESIN ADHESIVE COMPOSITION AND LAMINATED STRUCTURE UTILIZING THE SAME
Peter S. Columbus, Whitestone, and Ronald T. Mason, New York, N.Y., assignors to Borden, Inc., a corporation of New Jersey
No Drawing. Filed Aug. 4, 1965, Ser. No. 477,293
Int. Cl. B32b 27/08, 27/10, 27/30
U.S. Cl. 161—245                                                 5 Claims

ABSTRACT OF THE DISCLOSURE

This invention relates to an adhesive composition comprising (1) an interpolymer of vinyl acetate with a $C_2$–$C_{10}$ ester of an acid selected from the group consisting of fumaric, maleic, acrylic acids and mixtures thereof, and 0 to 5%, based on total weight of interpolymer, of a polymerizable monomer selected from the group consisting of ethenoid bond containing carboxylic acids, acid amides, and mixtures thereof; (2) a starch component selected from the group consisting of waxy starches, hydroxyalkyl starch ethers, acid modified starches, oxidized starches, and dextrines, and (3) a plasticizer for said interpolymer, there being, on a solids basis, about four parts of interpolymer and plasticizer combined for each part of the starch component; and to laminates made with such adhesives.

---

Present day techniques require the use of high speed machines to automatically apply and fasten labels to a variety of containers. Such machinery requires adhesives that must have a combination of properties. They must have (1) high initial tack in order to "pick" labels from the label bins and hold the label firm once applied to the container, and (2) "lay-flat" properties; i.e., will not blister but will cause the label to remain flat and smooth. In addition, the adhesives must be stable under the conditions of use and have clean machining properties. This latter characteristic is very important in automatic labeling equipment since adhesives now in use build up on the rollers and label picker arms necessitating shut down of the machinery for cleaning. While presently available jelly gums and resin adhesives exhibit varying degrees of these characteristics and are generally suitable for labeling many materials, they are inadequate for use in labeling plastic containers and, in particular, polyvinyl chloride and polystyrene containers. The main defects of such existing resin adhesives is their lack of initial tack, lack of clean machining properties, and high cost. Also, the jelly gums give very poor final adhesion to these plastic surfaces.

It has now been found that resin labeling adhesives can be prepared which have excellent adhesion to plastics while at the same time having the high initial tack, clean machining properties required for use in present labeling apparatus.

Briefly stated, the present invention is directed to a resin adhesive comprising a vinyl acetate interpolymer, a starch component, and a plasticizer for said interpolymer, there being, on a solids basis, about four parts of interpolymer and plasticizer for each part of the starch component, and to laminated structures utilizing said adhesive.

As to materials, the vinyl acetate interpolymer is suitably an interpolymer of vinyl acetate with a $C_2$–$C_{10}$ alkyl ester of fumaric, maleic or acrylic acids, and 0 to about 5% by weight, based on the total weight of the interpolymer, of a polymerizable monomer selected from the group consisting of ethenoid bond containing carboxylic acids, acid amides and mixtures thereof. Suitable esters are dibutyl maleate, dioctyl maleate, 2-ethylhexyl acrylate, ethyl acrylate, diethyl fumarate, dipropyl fumarate, dioctyl fumarate and mixtures thereof. Examples of such polymerizable monomers are acrylic acid, methacrylic acid, itaconic acid, crotonic acid, citraconic acid, maleic acid, fumaric acid, acrylamide, and methacrylamide.

Specific examples of suitable interpolymers are those formed by polymerizing 75 parts of vinyl acetate with 25 parts of 2-ethylhexyl acrylate; 74 parts of vinyl acetate with 24 parts of 2-ethylhexyl acrylate and 2 parts itaconic acid; and those formed by polymerizing 65–75 parts of vinyl acetate with 25–35 parts dioctyl maleate and ½ to 1½ parts of a mixture of acrylic acid and acrylamide. The method of making such interpolymers can be any of the usual procedures known to those skilled in the resin art and does not form any part of the instant invention.

As to the proportions, suitable are 35–55 parts and for most purposes about 40–50 parts of said ester for 100 of the vinyl acetate.

The starch component used is preferably waxy milo starch (sorghum starch). Waxy corn, tapioca, rice, and wheat starch can also be used, but are not as suitable. Other suitable starch components are hydroxyalkyl starch ethers, such as hydroxyethyl cornstarch ethers; oxidized starches, such as oxidized cornstarch and tapioca starch; acid-modified cornstarch, sorghum starch and tapioca starch; and dextrines, such as corn, tapioca, rice, potato, wheat, and sorghum dextrines. The dextrines while operative are the least suitable of the foregoing because of their relative lack of compatibility with the vinyl acetate interpolymrs and they give a poorer adhesive tensile strength.

The plasticizers that may be used are those that are substantially non-volatile liquid ester solvents for the vinyl acetate interpolymers. Suitable examples are dipropylene glycol dibenzoate; triacetin, chlorinated biphenyls and polyphenyls; dibutyl, diethyl, dimethyl, diisobutyl, butylbenzyl, dibutoxyethyl, and dioctyl phthalate; methyl phthalylethyl, butylphthalylbutyl, di(2 - ethylhexyl) phenyl, tricrestyl, cresyl diphenyl, tri (beta-chloroethyl), and monocresyl diphenyl phosphate; and the polyester plasticizers. Of these, dipropylene glycol dibenzoate is preferred.

Conventional defoamers and preservatives are used to advantage as are fluidifying agents and plasticizers for the starch, such as sodium nitrate, sodium chloride and calcium nitrate. In addition, the pH is adjusted to about 3 to 9. Preferably, the pH is from 5 to 6.5 for best commercial results.

For effecting the best clean machining properties, it is preferred to also incorporate in the adhesive a gum selected from the group consisting of gum tragacanth, gum karaya, Irish Moss, and mixtures thereof. Such gum can be added in amounts ranging from 0.05 part to about 5 parts by weight for each 100 parts by weight of resin and plasticizer in the adhesive.

Illustrative proportions of the materials and those that are commended for best commercial results are shown in the following table:

|  | Illustrative | Parts by weight for 100 parts of adhesive commercial recommendation |
|---|---|---|
| Vinyl acetate interpolymer (50–55% solids) | 20–70 | 40–50 |
| Starch (90–95% solids) | 2–20 | 8–12 |
| Plasticizer (100% solids) | 5–30 | 10–15 |

Within the ranges noted, optimum results are obtained when the ratio of resin and plasticizer to starch is about 4:1, based on total solids. The ratio can be varied dependent upon the activity of the plasticizer. The more active the plasticizer, i.e., the greater its softening action on the resin, the more starch that can be used in proportion of resin.

The invention will be further illustrated by detailed description in connection with the following specific examples of the practice of it. In these examples and elsewhere herein, proportions are expressed as parts by weight unless stated to the contrary.

EXAMPLE 1

| | Parts |
|---|---|
| Water | 22.68 |
| Gum tragacanth | .50 |
| Waxy milo starch | 11.00 |
| Sodium nitrate | 3.20 |
| Sodium hydroxide (18.5%) | .40 |
| Vinyl acetate interpolymer [1] (54.5% total solids) | 45.70 |
| Dipropylene glycol dibenzoate | 13.70 |
| Glycerine | 2.30 |
| Phenol | .30 |
| Defoamer | .22 |
| | 100.00 |

[1] Interpolymer of approximately 74 parts vinyl acetate, 24 parts 1-ethyl hexylacrylate, and 2 parts itaconic acid.

The water, gum tragacanth, waxy milo starch, and sodium nitrate were combined and heated to 85° C. with agitation for 15 minutes. The mixture was then cooled to 50° C. and the sodium hydroxide and vinyl acetate interpolymer added with continued agitation. Agitation was continued as the dipropylene glycol dibenzoate and remaining components were added, the mixture was adjusted to ambient temperature.

The viscosity of the resultant adhesive was adjusted with slight amounts of water to 180,000 cps. as measured by a Brookfield HVA viscosimeter using a No. 4 spindle.

The adhesive was stored for 2 months and after that time it was noted that the product had excellent shelf life in that there was no separation of the components and the viscosity was stable after this period of time.

The adhesive was then used to adhere paper labels to containers and the following tests were performed:

(1) After aging a group of the labeled containers in a dessicator at 0% relative humidity and at room temperature for 72 hours, the glued assembly was torn apart and 100% fiber failure was observed.

(2) The same test as in 1 above was performed on a second group except that the relative humidity was 95%. Again 100% fiber failure was observed.

EXAMPLE 2

The adhesive of Example 1 was used to adhere 4" x 6" paper labels onto polyvinyl chloride containers using a World Super CM–Two Station Labeler. The containers were fed to the labeler at the rate of 82 containers per minute (41 per station) and the machine was run for two and one-half hours.

The machining characteristics of the adhesive showed no stringing in transfering from the glue tray to the label; no buildup of adhesive on the picker plate; excellent initial tack (there was no label slippage); and excellent adhesion to the container. In addition, there was no residue on equipment parts and when the water tray was substituted for the glue tray, the machine ran normally showing the adhesive to be easily dispersed. In brief, it was an "easy-clean" adhesive.

When the adhesive was completely dry, adhesion tests as set forth in Example 1 showed 100% fiber failure.

EXAMPLE 3

Tests are run using the adhesive of Example 1 to adhere paper labels to bottles made of polystyrene, polyvinylidene chloride, and polyacrylics, such as polymethyl methacrylate and copolymers of acrylic acid and acrylic esters with polyvinyl chloride. In each case there is excellent adhesion to the plastic and paper (100% fiber failure) with the labeling machine being easy to clean.

EXAMPLE 4

Adhesives were made under the identical conditions set forth in Example 1 with the exception that equal amounts of each of the following starches was in turn used in place of waxy milo starch used therein:

(1) Acid modified corn starch
(2) Oxidized starch
(3) Raw corn starch
(4) Raw tapioca starch
(5) Tapioca dextrine
(6) Corn dextrine
(7) Potato dextrine Each adhesive in turn was used to adhere paper labels to polyvinyl chloride surfaces. While all were operative, the adhesives did not have the excellent tack and machining properties of the adhesive of Example 1.

EXAMPLE 5

| | Parts |
|---|---|
| Water | 12.500 |
| Gum tragacanth | .500 |
| Waxy milo starch | 12.000 |
| Sodium nitrate | 3.500 |
| Sodium hydroxide | .400 |
| Vinyl acetate interpolymer of Example 1 | 50.000 |
| Dipropylene glycol dibenzoate | 15.000 |
| Phenol | .300 |
| Glycerine | 2.500 |
| Oil of wintergreen | .005 |
| Defoamer | .100 |
| Water | 3.195 |
| | 100.000 |

The adhesive was compounded as set forth in Example 1 with 3.195 of water added to adjust the viscosity to 180,000 cps.

EXAMPLE 6

The method and formulation set forth in Example 1 are followed except that equal proportion of an interpolymer of 74.5 parts vinyl acetate, 24 parts dioctyl maleate, 0.5 part acrylic acid, and 1 part acrylamide is substituted for the vinyl acetate interpolymer used therein. Equally good adhesive and machining properties are obtained.

EXAMPLE 7

The method and formulation of Example 6 are followed except that ½ to 1½ parts of each of the polymerizable monomers set forth above is substituted for the acrylic acid and acrylamide used therein. Suitable adhesives are obtained in each case.

While the instant invention has been described in connection with adhering labels to plastic bottles it will be evident that it is operative for use in adhering various materials to plastic film members regardless of the form of the film; i.e., regardless of whether the film is in the form of bottles, sheets, surface coatings, etc.

It will be understood that it is intended to cover all changes and modifications of the examples of the invention herein chosen for the purpose of illustration which do not constitute departures from the spirit and scope of the invention.

What is claimed is:

1. A resin adhesive for labelling plastic containers consisting essentially of (1) as the sole resin component from about 20 to about 70 parts by weight of an interpolymer of vinyl acetate with a $C_2$–$C_{10}$ ester of an acid selected from the group consisting of fumaric, maleic, acrylic acids and mixtures thereof, in the proportion by weight of from 35 to 55 parts of ester for each 100 parts of vinyl acetate and 0 to 5% based on total weight of interpolymer, of a polymerizable monomer selected from the group consisting of ethenoid bond containing carboxylic acids, acid amides, and mixtures thereof; (2) from about 8 to about 12 parts by weight of a starch component selected from the group consisting of waxy starches, hydroxyalkyl starch ethers, acid modified starches, oxidized starches, and dextrines; and (3) from about 5 to about 30 parts by weight of a plasticizer for said interpolymer; there being, on a solids basis, about four parts of interpolymer and plasticizer combined for each part of the starch component.

2. A plastic-cellulosic structure comprising a plastic surface having adhered thereto a cellulosic sheet with the adhesive of claim 1 in cured condition.

3. A plastic-paper structure comprising a polyvinyl chloride bottle and a paper sheet adhered thereto with the adhesive of claim 1.

4. An adhesive as set forth in claim 1 additionally containing from about 0.05 to about 4 parts by weight of a water soluble gum selected from the group consisting of gum tragacanth, gum karaya, Irish moss, and mixtures thereof for each 100 parts by weight of resin and plasticizer in the adhesive.

5. An adhesive for adhering cellulosic materials to plastic containers consisting essentially of (1) from about 40 to about 50 parts by weight of an interpolymer of vinyl acetate with 2-ethylhexyl acrylate and itaconic acid, (2) from about 8 to about 12 parts by weight of a waxy milo starch, and (3) from about 10 to about 15 parts by weight of dipropylene glycol dibenzoate, there being, on a solids basis, about four parts of interpolymer and said dibenzoate combined for each part of the waxy milo starch.

References Cited

UNITED STATES PATENTS

| | | | |
|---|---|---|---|
| 2,880,898 | 4/1959 | Navikas | 215—1.5 |
| 3,036,977 | 5/1962 | Koch et al. | |
| 3,275,589 | 9/1966 | Alexander et al. | 260—29.6 |
| 2,628,948 | 2/1953 | Kunze et al. | 260—17 |
| 2,763,578 | 9/1956 | Simons. | |
| 2,885,374 | 5/1959 | Sweeney. | |
| 3,258,443 | 6/1966 | Cantor et al. | |
| 3,365,410 | 1/1968 | Wesslau et al. | |

OTHER REFERENCES

Gelva: Polyvinyl Acetate, Polymers and Copolymers, published by Shawinigan Resins Corp., 1961, pp. 12, 13, 16 and 17 cited.

ROBERT F. BURNETT, Primary Examiner

R. H. CRISS, Assistant Examiner

U.S. Cl. X.R.

40—310; 156—332; 161—249, 251, 254, 256; 260—17, 17.4, 31.4, 31.6, 31.8, 80.8, 85.7